United States Patent
Hume et al.

(10) Patent No.: US 10,523,117 B2
(45) Date of Patent: Dec. 31, 2019

(54) DEAD BAND DIRECT CURRENT CONVERTER

(71) Applicant: Southwire Company, LLC, Carrollton, GA (US)

(72) Inventors: Charles Hume, Parrish, FL (US); Brad Freeman, Palm Harbor, FL (US); Dave Sykes, Pinellas Park, FL (US); Aldo Della Sera, Saint Petersburg, FL (US)

(73) Assignee: Southwire Company, LLC, Carrollton, GA (US)

( * ) Notice: Subject to any disclaimer, the term of this patent is extended or adjusted under 35 U.S.C. 154(b) by 27 days.

(21) Appl. No.: 15/805,979

(22) Filed: Nov. 7, 2017

(65) Prior Publication Data
US 2018/0131272 A1     May 10, 2018

Related U.S. Application Data

(60) Provisional application No. 62/418,540, filed on Nov. 7, 2016.

(51) Int. Cl.
*H02M 3/155* (2006.01)
*H02J 3/38* (2006.01)
(Continued)

(52) U.S. Cl.
CPC ............. *H02M 3/155* (2013.01); *H02J 1/00* (2013.01); *H02J 3/00* (2013.01); *H02J 3/383* (2013.01);
(Continued)

(58) Field of Classification Search
CPC .......... H02M 3/155; H02M 1/08; H02M 7/44; H02J 1/00; H02J 3/00; H02J 3/383; Y02P 80/23
See application file for complete search history.

(56) References Cited

U.S. PATENT DOCUMENTS

| 6,111,767 A | 8/2000 | Handleman et al. |
| 6,429,546 B1 | 8/2002 | Ropp et al. |

(Continued)

FOREIGN PATENT DOCUMENTS

| CA | 2906590 A1 | 9/2014 |
| CN | 104158394 A | 11/2014 |

(Continued)

OTHER PUBLICATIONS

International Searching Authority, International Search Report and Written Opinion for International Application No. PCT/US2017/060428, dated Feb. 7, 2018, 15 pages, European Patent Office, Netherlands.

(Continued)

*Primary Examiner* — Robert L Deberadinis
(74) *Attorney, Agent, or Firm* — Alston & Bird LLP

(57) ABSTRACT

A photovoltaic power system for supplying power to an electric grid is provided, in which a plurality of photovoltaic panels are each configured for generating a DC power signal. A plurality of DC-DC power converters connected to the photovoltaic panels are provided for converting the DC power signal into a deadband DC signal having a rectified sine waveform with reoccurring deadband periods, which reduces the risk of arcing during power transmission. An electric network interface is used to convert the deadband DC signal received from the plurality of DC-DC power converters into an AC power signal.

16 Claims, 10 Drawing Sheets

(51) Int. Cl.
    *H02M 1/08* (2006.01)
    *H02M 7/44* (2006.01)
    *H02J 1/00* (2006.01)
    *H02J 3/00* (2006.01)

(52) U.S. Cl.
    CPC .............. *H02M 1/08* (2013.01); *H02M 7/44* (2013.01); *Y02P 80/23* (2015.11)

(56) References Cited

U.S. PATENT DOCUMENTS

| | | |
|---|---|---|
| 8,106,537 B2 | 1/2012 | Casey et al. |
| 8,134,820 B1 | 3/2012 | Riccio et al. |
| 8,207,637 B2 | 6/2012 | Marroquin et al. |
| 8,257,106 B2 | 9/2012 | Fornage et al. |
| 8,410,950 B2 | 4/2013 | Takehara et al. |
| 8,435,056 B2 | 5/2013 | Fornage et al. |
| 8,472,220 B2 | 6/2013 | Garrity et al. |
| 8,581,441 B2 | 11/2013 | Rotzoll et al. |
| 8,626,616 B2 | 1/2014 | Eich |
| 8,824,178 B1 | 9/2014 | Baker et al. |
| 9,165,275 B2 | 10/2015 | Fornage |
| 9,750,102 B1 | 8/2017 | Mao et al. |
| 2006/0002110 A1 | 1/2006 | Dowling et al. |
| 2008/0285317 A1 | 11/2008 | Rotzoll |
| 2010/0066260 A1 | 3/2010 | Newman, Jr. et al. |
| 2010/0071742 A1 | 3/2010 | de Rooij et al. |
| 2010/0134959 A1 | 6/2010 | Fife et al. |
| 2010/0141158 A1 | 6/2010 | Newman, Jr. et al. |
| 2010/0263704 A1 | 10/2010 | Fornage et al. |
| 2010/0289337 A1 | 11/2010 | Stauth et al. |
| 2010/0307479 A1 | 12/2010 | Park |
| 2011/0061705 A1 | 3/2011 | Croft et al. |
| 2011/0090089 A1 | 4/2011 | Luo |
| 2011/0121744 A1 | 5/2011 | Salvestrini et al. |
| 2011/0202181 A1 | 8/2011 | Lee et al. |
| 2011/0210611 A1 | 9/2011 | Ledenev et al. |
| 2011/0225904 A1 | 9/2011 | Railkar et al. |
| 2011/0248640 A1 | 10/2011 | Welten |
| 2011/0273015 A1 | 11/2011 | Adest et al. |
| 2011/0273016 A1 | 11/2011 | Adest et al. |
| 2012/0019074 A1 | 1/2012 | Frolov et al. |
| 2012/0080944 A1 | 4/2012 | Recker et al. |
| 2012/0081934 A1 | 4/2012 | Garrity et al. |
| 2012/0084027 A1 | 4/2012 | Caine |
| 2012/0089260 A1 | 4/2012 | Krohne et al. |
| 2012/0138123 A1 | 6/2012 | Newdoll et al. |
| 2012/0175955 A1 | 7/2012 | Carralero et al. |
| 2012/0175964 A1 | 7/2012 | Yoscovich et al. |
| 2012/0248863 A1 | 10/2012 | Adest et al. |
| 2012/0310427 A1 | 12/2012 | Williams et al. |
| 2012/0313443 A1 | 12/2012 | Cheng et al. |
| 2013/0002031 A1 | 1/2013 | Mulkey et al. |
| 2013/0012061 A1 | 1/2013 | Rotzoll et al. |
| 2013/0021006 A1 | 1/2013 | Fornage |
| 2013/0113291 A1 | 5/2013 | Recker et al. |
| 2013/0241535 A1 | 9/2013 | Magnussen et al. |
| 2013/0346054 A1 | 12/2013 | Mumtaz |
| 2014/0077609 A1 | 3/2014 | Fornage |
| 2014/0191583 A1 | 7/2014 | Chisenga et al. |
| 2014/0265585 A1 | 9/2014 | Della Sera et al. |
| 2014/0266289 A1 | 9/2014 | Della Sera et al. |
| 2014/0361695 A1 | 12/2014 | Akiyama et al. |
| 2015/0237700 A1 | 8/2015 | Woytowitz |
| 2015/0244250 A1 | 8/2015 | Toth et al. |
| 2016/0072396 A1 | 3/2016 | Deboy et al. |
| 2016/0226252 A1 | 8/2016 | Kravtiz et al. |
| 2017/0019960 A1 | 1/2017 | Qu et al. |
| 2017/0027029 A1 | 1/2017 | Hu et al. |
| 2017/0223807 A1 | 8/2017 | Recker et al. |
| 2017/0231058 A1 | 8/2017 | Sadwick |
| 2017/0238401 A1 | 8/2017 | Sadwick et al. |

FOREIGN PATENT DOCUMENTS

| | | |
|---|---|---|
| EP | 2973976 B1 | 1/2016 |
| JP | H10174452 A | 6/1998 |
| JP | 2001238466 A | 8/2001 |
| WO | WO 03/077398 B2 | 9/2003 |
| WO | WO-2012/170726 A2 | 12/2012 |
| WO | WO-2013/107782 A2 | 7/2013 |
| WO | WO-2014/152765 A2 | 9/2014 |

OTHER PUBLICATIONS

Vu, Trung-Kien, et al., "A new adaptive dead-time compensation for single-phase grid-connected PV inverter", Proceeding of 26th Annual Applied Power Electronics Conference and Exposition (APEC), Mar. 6, 2011, pp. 923-930, IEEE, U.S.

Microchip Technology Inc. *Grid-Connected Solar Microinverter Reference Design Using a dsPIC® Digital Signal Controller*, AN1338 Technical Bulletin, Jul. 2010, 56 pages, retrieved from <http://ww1.microchip.com/downloads/en/AppNotes/01338D.pdf> on Jul. 22, 2016.

Roos et al., *Solar Electric System Design, Operation and Installation*, Washington State University Extension Energy Program, Oct. 2009, (35 pages). [Retrieved from the Internet Aug. 6, 2019] <www.energy.wsu.edu/Documents/SolarPVforBuildersOct2009.pdf>.

European Patent Office, Communication Pursuant to Rules 161(2) and 162 EPC for Application No. 14770361.5, Nov. 5, 2015, 2 pages, Germany.

European Patent Office, Extended European Search Report for Application No. 14770361.5, Nov. 24, 2016, 9 pages, Germany.

European Patent Office, Communication Pursuant to Rules 70(2) and 70a(2) EPC for Application No. 14770361.5, Dec. 13, 2016, 1 page, Germany.

European Patent Office, Communication Under Rule 71(3) EPC for Application No. 14770361.5, Nov. 14, 2018, 61 pages, Germany.

International Searching Authority, International Search Report and Written Opinion for International Application No. PCT/US2014/027708, dated oct. 2, 2014, 24 pages, United States Patent and Trademark Office, U.S.A.

International Bureau of WIPO, International Preliminary Report on Patentability for International Application No. PCT/US2014/027708, dated Sep. 15, 2015, 22 pages, Switzerland.

International Searching Authority, International Search Report and Written Opinion for International Application No. PCT/US2016/016059, Jun. 27, 2016, 14 pages, The Netherlands.

International Searching Authority, International Search Report and Written Opinion for International Applicaiton No. PCT/US2016/067556, Mar. 16, 2017, 15 pages, The Netherlands.

United States Patent and Trademark Office, Office Action for U.S. Appl. No. 14/211,693, dated Mar. 11, 2016, 7 pages, U.S.A.

United States Patent and Trademark Office, Office Action for U.S. Appl. No. 14/211,693, dated Dec. 19, 2016, 8 pages, U.S.A.

United States Patent and Trademark Office, Office Action for U.S. Appl. No. 14/211,693, dated Apr. 21, 2017, 12 pages, U.S.A.

United States Patent and Trademark Office, Office Action for U.S. Appl. No. 16/100,961, dated Mar. 22, 2019, 19 pages, U.S.A.

United States Patent and Trademark Office, Office Action for U.S. Appl. No. 15/383,647, dated May 1, 2019, 12 pages, U.S.A.

United States Patent and Trademark Office, Notice of Allowance for U.S. Appl. No. 14/058,270, dated Sep. 23, 2016, 12 pages, U.S.A.

United States Patent and Trademark Office, Corrected Notice of Allowability for U.S. Appl. No. 14/058,270, dated Dec. 28, 2016, 3 pages, U.S.A.

United States Patent and Trademark Office, Notice of Allowance for U.S. Appl. No. 14/612,159, dated Jan. 3, 2017, 17 pges, U.S.A.

United States Patent and Trademark Office, Notice of Allowance for U.S. Appl. No. 15/425,767, dated Sep. 14, 2018, 13 pages, U.S.A.

U.S. Appl. No. 61/270,809, "Method and System for Locating Stolen Solar Power Systems Components", Unpublished (filed Jul. 14, 2009), (Martin Fornage, Inventor and Assignee).

(56) References Cited

OTHER PUBLICATIONS

Argentine Patent and Trademark Office, Office Action for Argentine Patent Application No. 20140101267, Mar. 11, 2019, 5 pages, Argentina.

Mexican Patent Office, Office Action for Mexican Patent Application No. MX/a/2015/012438, Dec. 4, 2017, 2 pages, Mexico.

Mexican Patent Office, Notice of Allowance for Mexican Patent Application No. MX/a/2015/012438, Jun. 11, 2018, 1 page, Mexico.

Chilean Patent and Trademark Office, Written Opinion for Chilean Patent Application No. 201502718, dated Jan. 15, 2018, 11 pages, Chile.

DEAD BAND DIRECT CURRENT CONVERTER

CROSS REFERENCE TO RELATED APPLICATIONS

This application claims priority to and the benefit of U.S. Provisional Application No. 62/418,540, filed Nov. 7, 2016; the contents of which is hereby incorporated by reference in its entirety.

BACKGROUND

Field of the Invention

The present invention generally relates to power distribution systems and methods and, in certain embodiments, to photovoltaic power distribution systems and methods.

Description of Related Art

Direct Current (DC) electric transmission and distribution systems are highly susceptible to arc faults, due to the nature of DC transmission. To protect against potential hazards from arc faults, including the risk of fire and the risk of electric shock, conventional DC systems require large and expensive protection equipment, such as DC-rated circuit breakers. Those working on DC systems must also wear substantial personal safety equipment for protection.

FIG. 1A shows an example standard AC waveform 101. As shown, the waveform 101 regularly crosses a zero voltage—indicated as AC voltage waveform zero crossing 102. The zero voltage allows for any arcs that may develop in an AC power transmission or distribution system to be easily extinguished during the zero crossing and for a circuit breaker to easily break a circuit. By contrast, FIG. 1B shows a standard DC waveform 103, which remains at a constant level and does not include regular zero voltage levels or crossings. Because there is no zero crossing, a DC-rated circuit breaker having a far more complicated arc extinguishing and circuit breaking method is needed in order safely transmit the waveform 103

As an example of a DC power source, photovoltaic (PV) cells are currently used to harvest solar energy for use in industrial, commercial, residential, and/or other power generation, transmission, and distribution environments. Conventionally, however, the DC power produced by a PV cell is immediately converted to alternating current (AC) by an inverter before being distributed to the grid or powered devices. Although this avoids some of the safety concerns associated with DC transmission and the need to use DC-rated circuit breakers, the use of inverters in this capacity also represents a source of cost and a fundamental inefficiency in these systems. In particular, this increases the cost-per-watt of the overall system and makes the system less attractive as a source of renewable energy. Moreover, many powered devices—such as portable electronics and lighting systems—must convert AC power received from an outlet back to usable DC power, further reducing the efficiency of AC transmission from a DC source.

Accordingly, there is on-going need in the art to enable more cost-effective, efficient, and reliable use of DC power sources and to do so safely.

BRIEF SUMMARY

Various embodiments of the present invention are directed to a photovoltaic power system for supplying power to an electric grid, the system. According to various embodiments, the system includes: (i) a solar array comprising a plurality of photovoltaic panels, where each photovoltaic panel is configured for generating a DC power signal; (ii) a plurality of DC-DC power converters each connected to at least one of the photovoltaic panels and configured for converting the DC power signal generated by its respective photovoltaic panel into a deadband DC signal, where the deadband DC signal comprises a rectified sine waveform having reoccurring deadband periods of zero-voltage; and (iii) an electric network interface connected to the plurality of DC-DC power converters and configured for converting a deadband DC signal received from the plurality of DC-DC power converters into an AC power signal, where the electric network interface is further connected to an electric grid and configured for supplying the AC power signal to the electric grid.

In certain embodiments, the DC-DC power converters each include a pair of switching transistors configured for converting the DC power signal into the deadb and DC signal. In certain embodiments, the DC-DC power converters are connected in series. Additionally, in certain embodiments, the DC-DC power converters are integrated as part of a continuous trunk cable, which may include a plurality of housings. In such embodiments, each DC-DC power converter may comprise a removable cartridge configured for being selectively engaged within one of the housings and thereby electrically integrated into the trunk cable. In particular, the trunk cable may comprise in certain embodiments a 20-ampere rated cable.

According to various embodiments, the duration of each deadband period of zero voltage may be, for example, approximately 100 microseconds, while the deadband DC signal's rectified sine waveform may have a frequency of, for example, approximately 60 Hz. Furthermore, in certain embodiments, the DC-DC power converters are configured to vary the duration of each the deadband periods. The electric network interface may also be configured to communicate with and synchronize each of the DC-DC power converters.

According to yet another embodiment of the present invention, a power distribution system for supplying AC power to an electric network is provided. In various embodiments, the system comprises (i) one or more DC-power sources each configured for generating a DC power signal; (ii) one or more DC-DC power converters each connected to at least one of the DC-power sources and configured for converting a DC power signal received from one of the DC-power sources into a deadband DC signal, where the deadband DC signal comprises a rectified waveform having reoccurring deadband periods; and (iii) an electric network interface connected to the plurality of DC-DC power converters and configured for converting a deadband DC signal received from the plurality of DC-DC power converters into an AC power signal.

BRIEF DESCRIPTION OF THE DRAWINGS

Reference will now be made to the drawings, which are not necessarily drawn to scale, and wherein.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

In some embodiments, a dead band DC distribution system, inserts regular periods of zero voltage or "dead time" into a DC power signal. In some embodiments, the dead band DC converter system also advantageously shapes the DC power signal into a shaped waveform described in further detail herein. According to various embodiments a dead band DC distribution system is provided that allows power to be more easily interrupted by a circuit breaker. In particular, the dead band DC converter system is configured so that standard AC rated breakers can be used instead of typically more expensive DC rated breakers to protect against sustained arcs and overcurrent conditions. According to various embodiments, if an arc develops in the dead band DC distribution system (for example due to faulty wiring or a damaged connector), the arc that is created by the fault will extinguish during the next regular period of zero voltage. In this way, the dead band DC distribution system will behave similarly to an AC system, in which arcs typically extinguish when the AC signal crosses through zero volts.

In various embodiments, this technique will allow the use of smaller AC rated equipment such as circuit breakers in DC electrical distribution systems, saving significantly on cost and size. According to various embodiments, the period of zero voltage can be adjusted based on the voltage and/or current level. Furthermore, a variety of wave shapes in the waveform can be utilized for this purpose to optimize transmission of electric power, each of which includes a regular period of zero voltage (e.g., as shown in relation to FIGS. 4A and 4B described below). In effect, the dead time in the shaped waveform matches the zero crossing advantage of traditional AC waveforms without requiring full inversion of the power to AC.

Figure 2:
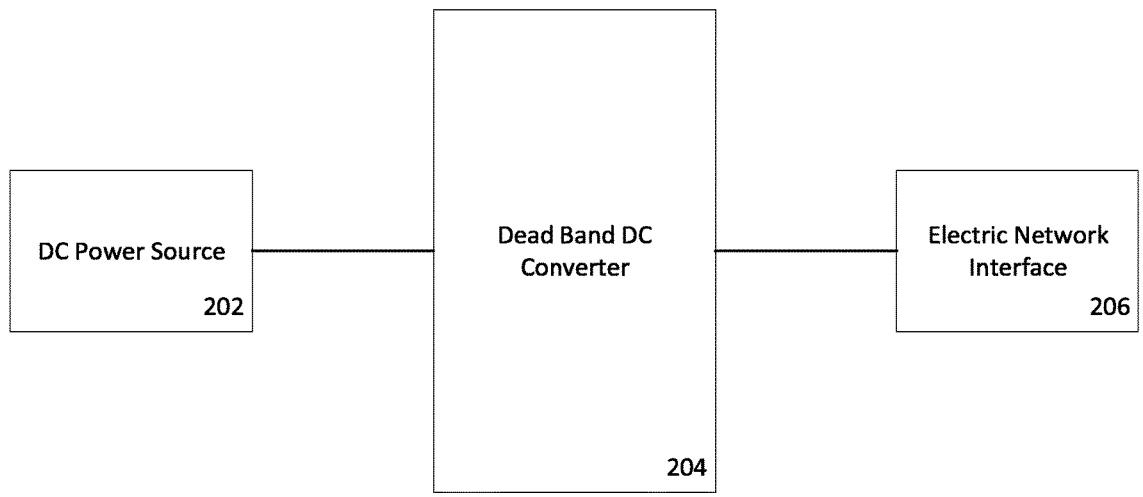
FIG. 2 shows a schematic diagram of a dead band DC converter system.

FIG. 2 shows a schematic diagram of a dead band DC converter system. The example embodiment includes a DC power source 202. In some examples, DC power source 202 can be embodied by one or more of a plurality of DC power sources, such as a solar panel, an array of solar panels, a windmill, a fuel cell, a generator, a battery, an AC-to-DC transformer or a combination of one or more of a plurality of DC power sources, including those not listed here.

The example embodiment of FIG. 2 also includes a dead band DC converter 204 receiving DC power from DC power source 202. In some examples, dead band DC converter 204 is configured to convert a standard DC waveform, such as waveform 103, into a shaped dead band DC waveform. Converting standard DC waveforms into dead band DC waveforms are discussed in further detail in relation to FIGS. 3, 4A, and 4B.

The example embodiment of FIG. 2 also includes an electric network interface 206, which receives the shaped dead band DC waveform from dead band DC converter 204. In some embodiments, electric network interface 206 is configured as an inverter to invert the shaped dead band DC waveform from dead band DC converter 204 into an output AC waveform. In some embodiments, the output AC waveform is configured to be output into an AC power network, such as a local power utility grid.

In some example embodiments, electric network interface 206 is configured to output the dead band DC waveform from dead band DC converter 204 to a DC distribution system, such as DC distribution system in a home or business. In some examples, electric network interface 206 is configured to directly output the dead band DC waveform from dead band DC converter 204 to the DC distribution system. In some examples, electric network interface 206 is configured to transform the dead band DC waveform to a higher or lower voltage according to the configuration of the DC distribution system.

In some examples, electric network interface 206 is configured to output both an AC signal for an AC power network, such as outputting to a local power utility, and a DC distribution system, such as DC distribution system in a home or business. In some examples, the proportion of the amount of output sent as an AC signal to the AC power network, versus the output sent as a DC signal, depends on factors such as the amount of power supplied by DC power source 202, the power demand of the DC distribution system, a user's preferences, and/or the power demand of the AC power network. For example, if the power demand of a DC distribution network in a home is elevated due to an increased amount of activity inside the home, electric network interface 206 may direct most or all of the power from DC power source 202 and dead band DC converter 204 to the DC distribution system for use in the home instead of directing the power to the AC power network. In some examples, if the power demand of the DC distribution network in a home is minimal due to lower energy demand, electric network interface may be configured to output most or all of the power from DC power source 202 and dead band DC converter 204 to the AC power network, such as a local utility grid.

Figure 3:
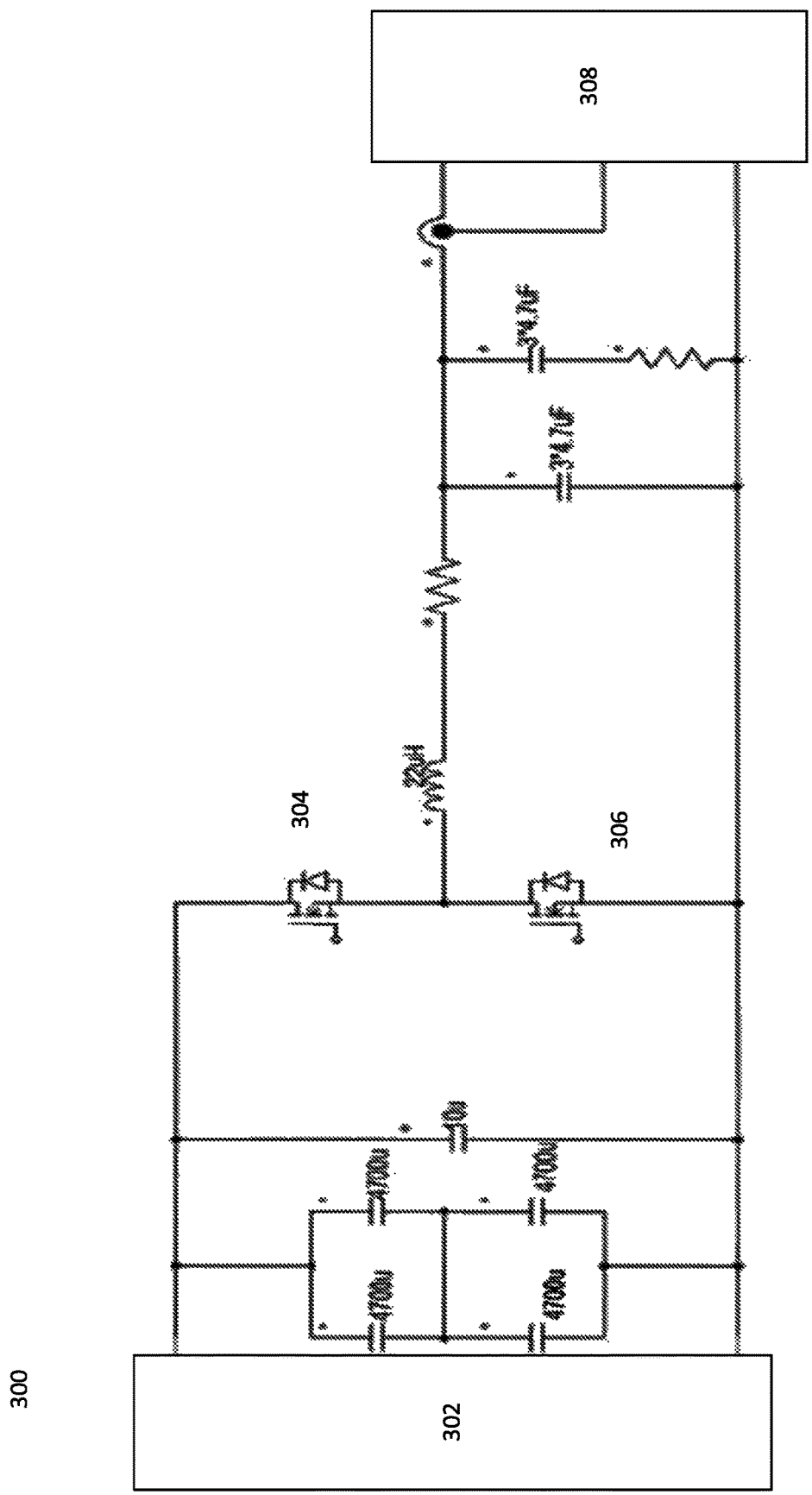
FIG. 3 shows an exemplary circuit diagram for a dead band DC-DC power converter.

FIG. 3 shows a circuit diagram for a dead band DC-DC power converter 300. In some examples, dead band DC-DC power converter 300 may be embodied in converters such as dead band DC converter 204 or other embodiments described herein. In this example, the input DC power is supplied from DC power 302. In some examples, DC power 302 may be DC power source 202 or other embodiments described herein.

In some examples, dead band DC-DC power converter 300 includes switching transistors 304 and 306, which may be configured to regulate power flow through the converter to the output dead band DC power 308. The switching transistors 304 and 306 are configured to vary switching times in the converter to convert a flat standard DC waveform such as waveform 103 into a shaped DC waveform with a "dead time" or to insert a dead band into the signal.

Figure 1A:
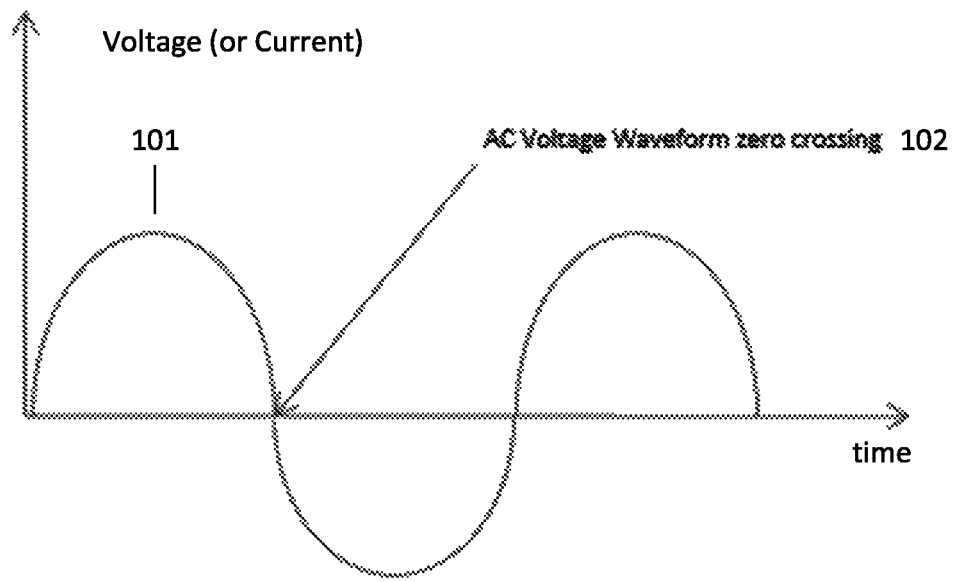
FIG. 1A shows an example standard Alternating Current (AC) waveform.
Figure 1B:
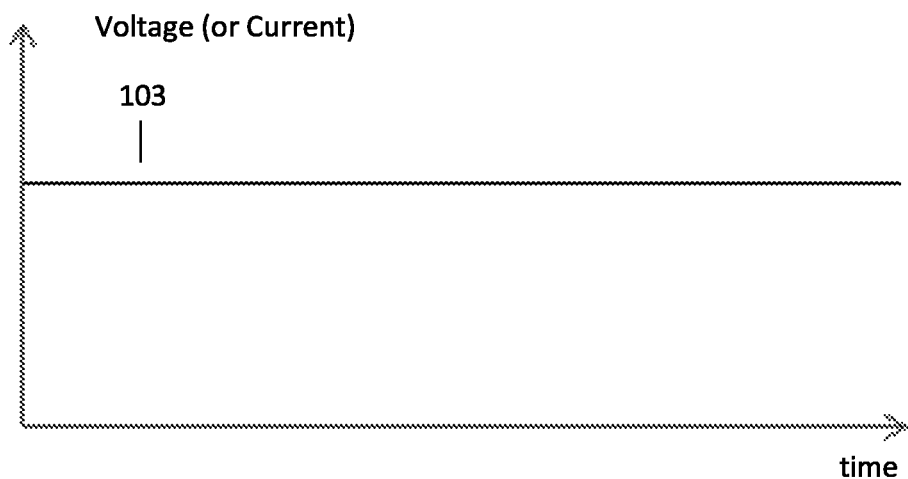
FIG. 1B shows example standard Direct Current (DC) waveform.
Figure 4A:
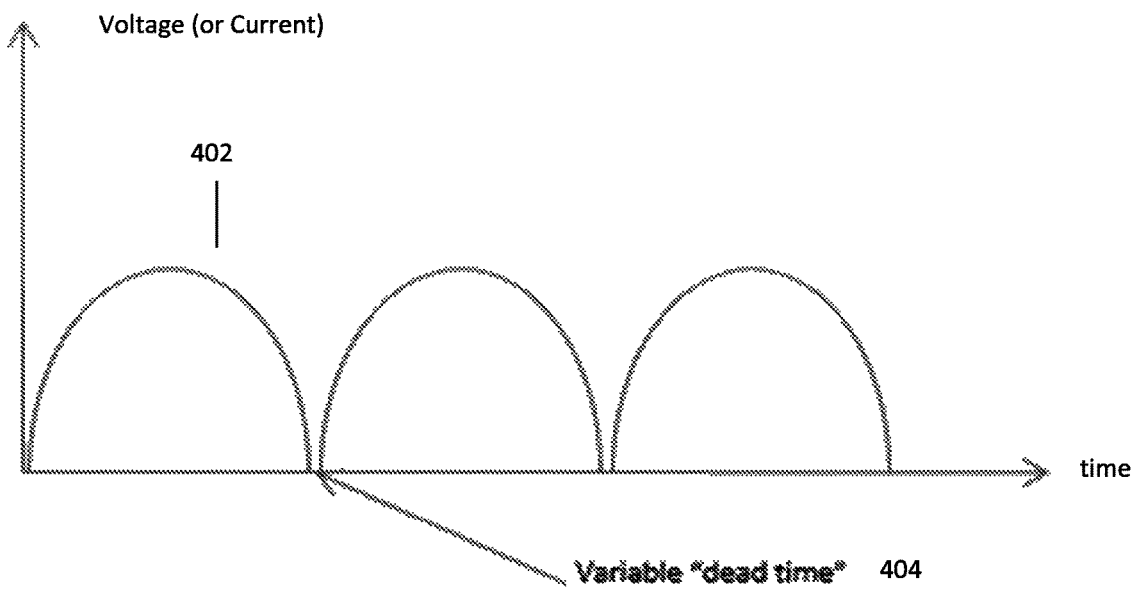
FIG. 4A shows an exemplary dead band DC waveform according to one embodiment.
Figure 4B:
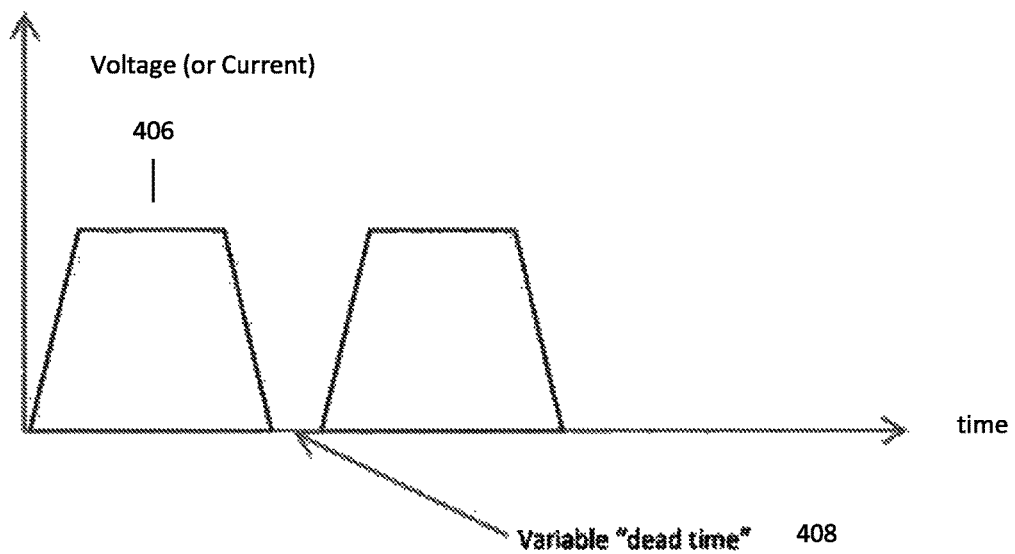
FIG. 4B shows an exemplary dead band DC waveform according to one embodiment.

FIGS. 4A and 4B show example waveforms, which may be generated by dead band DC-DC power converter 300. For example, waveform 402 may be generated by switching transistors 304 and 306 and by including a variable dead time 404 to create a dead band DC waveform, such as a dead band rectified sine waveform represented in waveform 402. Alternatively or additionally, waveform 406 may be generated by switching transistors 304 and 306 and include a variable dead time 408 to create an alternate dead band DC waveform. In both of these examples, the variable dead times 404 and 408 are similar to the AC voltage waveform zero crossing 102 as shown in FIG. 1A, allowing for standard AC rated equipment, such as AC circuit breakers to be used for overcurrent and arc protection. In some examples, the dead times 404 and 408 can be adjusted for time length such that power transmission is optimized while still providing the advantages of the dead band DC power. In some examples, variable dead times 404 and 408 may comprises a non-zero voltage, such that the voltage of the output is low enough to function as a dead band and allow for extinguishing arcs, and use of AC equipment.

Additionally, the shaping of standard DC of both waveforms 404 and 408 allows for easier utilization of standard DC power into other applications such as outputting to an AC power network or distribution in a dead band DC distribution system. For example, since the shaped waveform 402 is similar to a rectified AC sine waveform, thus allowing easy inversion of waveform 402 into a standard AC waveform, such as waveform 101, for output onto a local grid. Furthermore, the shaping of the standard DC waveform into a shaped waveform allows for insertion of dead bands into the waveform without causing an increased electromagnetic interference which may be caused by sharp changes in voltage or current.

Referring back to FIG. 2 and FIG. 3, in some examples, DC-DC power converter 300 may be embodied in dead band DC converter 204, wherein dead band DC converter 204 is configured to be connected to an input DC power source, such as DC power source 202, and detect properties of the input DC power source, such as voltage or current. In some examples, dead band DC converter 204 is configured to determine properties for an output DC signal, such as voltage, dead band time, and waveform. In some examples, the DC converter, such as dead band DC converter 204 is in communication with an electric network interface, such as electric network interface 206, which may specify properties for the output DC signal, such as output dead band DC power 308. For example, dead band DC converter 204 may be configured to determine, from the specified properties, that the output DC signal should have 100 microsecond dead time and have a waveform suitable for inversion to an AC signal, such as waveform 402.

In some embodiments, dead band DC converter 204, is configured to control switching transistors 304 and 306 to produce a desired output dead band DC power 308 from the input DC power source 302, having the specified properties, including an adjustable voltage, dead band time, and waveform.

Referring back to FIG. 3, in some examples, input DC power 302 and output power 308 can be single phase 120 volt electrical system. The converter can be used to generate a rectified voltage at the output 308, similar to the waveform shown in FIG. 4A. In this example, switching transistors 304 and 306 may be configured to include a 100 microsecond dead time or dead band, such as variable dead times 404 and 408, approximately every 8.33 milliseconds. An approximate 8.33 millisecond interval would correspond to a rectified AC 60 Hz signal, but the invention is suitable for use with other types of electrical systems, including 50 hertz electric systems. In some examples, as the current or voltage of the input DC power 302 may be greater or less than the example above, thus switching transistors 304 and 306 may be configured to insert longer or shorter dead times or dead bands over longer or shorter times spans.

In addition, it should be understood that the present invention is suitable for many types of DC power sources such as with other types of renewable energy sources such as windmills, water wheels, geothermal and is suitable for with other types energy storages devices such as fuel cells, capacitor banks and/or the like.

Figure 5A:
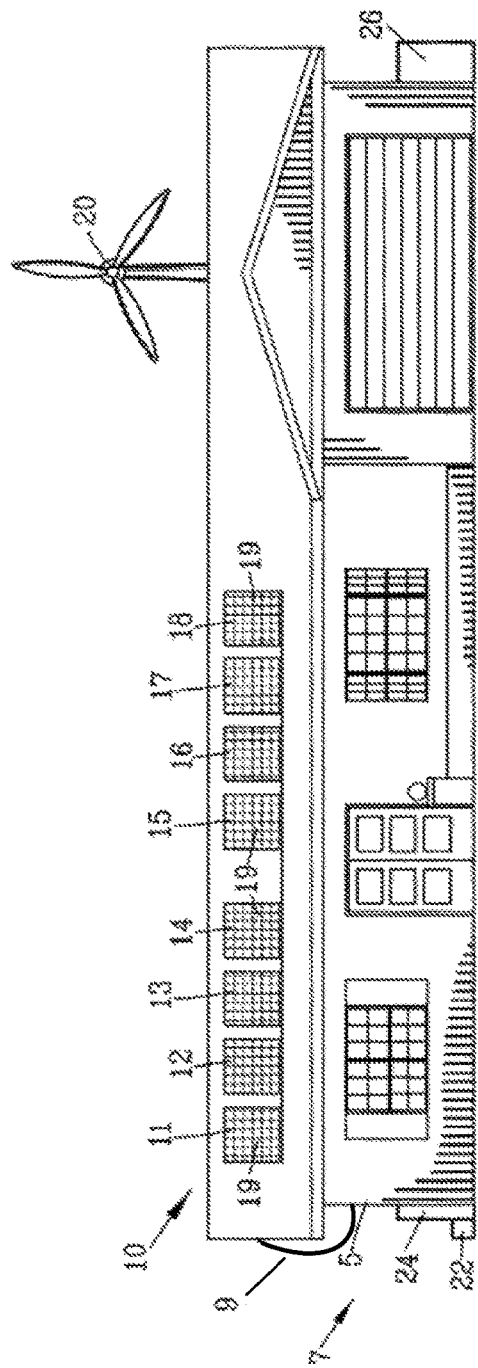
FIG. 5A shows a residential environment having a photovoltaic DC power system according to one embodiment.
Figure 5B:
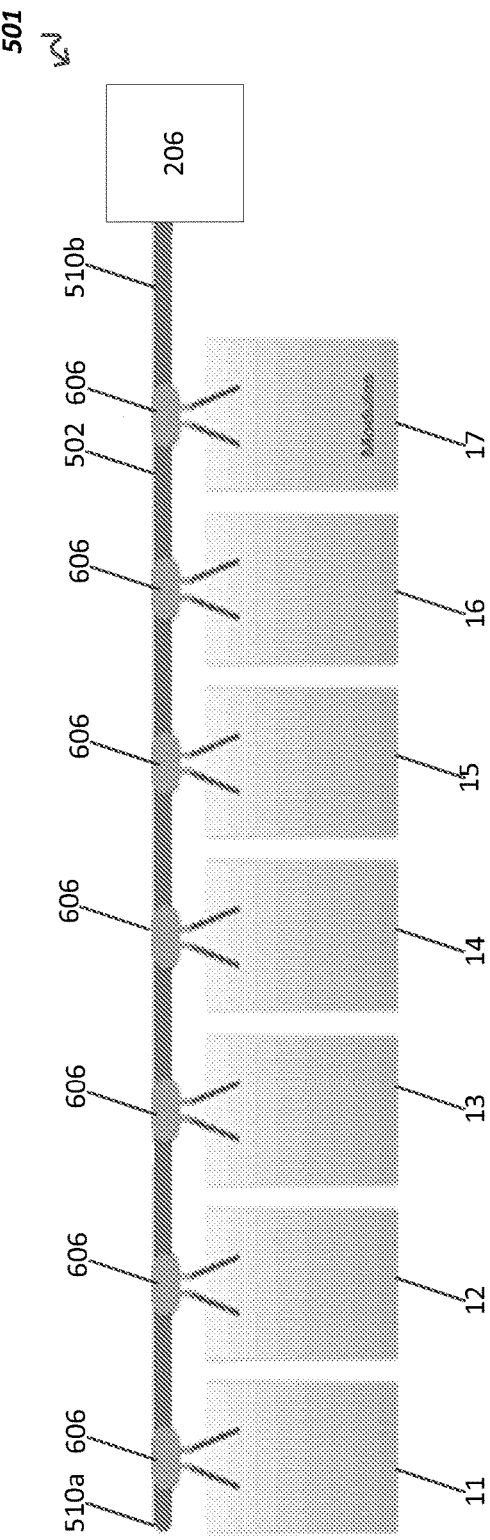
FIG. 5B is shows a schematic of a cable integrated dead band DC-DC converter system according to one embodiment.

Referring to FIGS. 5A and 5B, according to certain embodiments, the dead band DC distribution system is embodied as a cable-integrated converter system provided for converting DC power received from photovoltaic cells into dead band DC power. The cable-integrated converter system can be used in conjunction with a variety of photovoltaic power systems, including systems in industrial, commercial, residential, and/or other power generation transmission and distribution environments. As an example, FIG. 5A shows a building structure 5 having a photovoltaic power system interconnected with dead band DC distribution system 9 routed through structure 5. In the illustrated embodiment, the photovoltaic power system includes a photovoltaic solar array 10. In particular, the solar array 10 is configured to generate power in combination with a wind turbine 20, which can be stored in an energy storage unit (e.g., comprised of the illustrated battery array 22 and a fuel cell array 24). In the illustrated embodiment, a fuel operated generator 26 is also provided for emergency operation.

The photovoltaic solar array 10 of FIG. 5A comprises a plurality of photovoltaic solar panels 11-18. Although the building structure 5 has been shown as a residential building structure, it should be understood that the photovoltaic solar array 10 may be mounted on virtually any type of building structure or on a ground surface. In one embodiment, each of the plurality of photovoltaic solar panels 11-18 is made from a multiplicity of photovoltaic solar cells 19. Each of the photovoltaic solar cells 19 may generate, for example, approximately 0.5 volts. When connected in series—parallel, the cells 19 together may provide, for example, approximately 300 watts of power at 30 volts. In some instances, individual photovoltaic solar panels 11-18 are mounted on equatorial mounts (not shown) for following the movement of the sun throughout the day.

FIG. 5B shows a schematic diagram of a cable-integrated converter system 108 according to one embodiment. In the illustrated embodiment, the cable-integrated converter system 501 includes a trunk cable 502, a plurality of power converters 606 distributed along the trunk cable 502, and an electric network interface 206. As shown in FIG. 5B, the power converters 606 are each electrically connected to one of a plurality of photovoltaic modules 11-18. The power converters 606 are also connected to one another in series via the trunk cable 502. As explained in greater detail herein, the power converters 606 are each configured to function as a dead band DC power converter, such as dead band DC converter 204. In operation, the power converters 606 convert DC power received from the photovoltaic modules 11-18 into a variety of shaped DC waveforms with dead bands, including, for example a rectified half-sine wave signal with a dead band or waveforms 402 and 404, which are added and delivered via the trunk cable 502 to electric network interface 206.

In some examples, multiple power converters, such as power converters 606, feeding into a single line, such as trunk cable 502, requires that power converters are highly synchronized in order to prevent failures in the equipment due to differences in synchronization. In some examples electric network interface 206 is configured to communicate with power converters 606 through trunk cable 502, and provide the necessary parameters to ensure synchronization. Furthermore, the inclusion of the dead band advantageously aids in this synchronization. For example, in DC to AC inversion, the dead band allows for an improved synchronization between the signal switching between positive and negative signals.

As shown in FIG. 5B, the power converters are integrated into the trunk cable 502, which connects the power converters 606 in series. As an example, in one embodiment the trunk cable 502 comprises a 30-ampere rated AC cable. In another embodiment, the trunk cable 502 comprises a 20-ampere rated AC cable. The trunk cable 502 extends between the integrated power converters 606, which can be embedded, enclosed, or otherwise integrated into the cable in a variety of ways. In some examples, trunk cable 502 comprises at least two wires for power transmission and two wires for communication between power converters 606 and electric network interface 206.

Figure 6A:
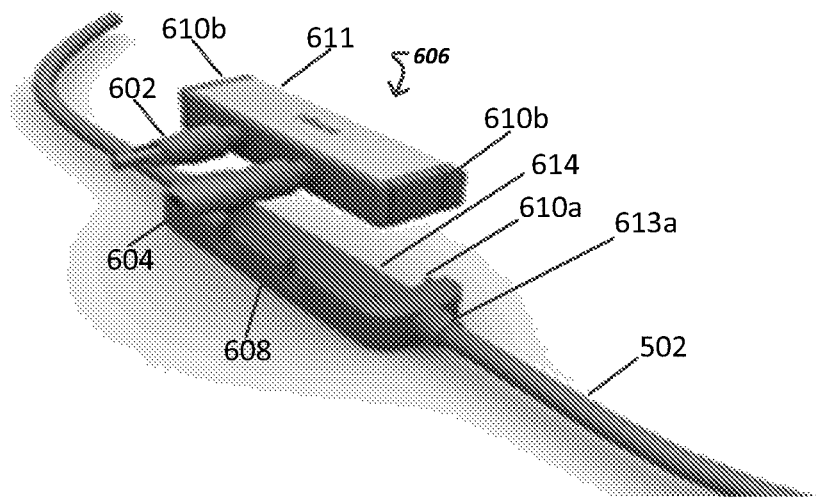
FIG. 6A shows an isometric view of a power converter cartridge and housing in which the power converter cartridge is detached from the housing according to one embodiment.

As one example, FIG. 6A shows an isometric view of a cable-integrated dead band DC power converter 606 according to one embodiment. In the illustrated embodiment, to facilitate ease of maintenance and replacement of faulty devices, the power converter 606 comprises a removable cartridge 611 that can be selectively removed from the trunk cable 502. In particular, as shown in FIG. 6A, the power converter cartridge 611 is configured to be selectively secured to a housing 608. According to various embodiments, the housing 608 may be constructed from a thermally conductive material (e.g., metals, metal alloys, thermally conductive plastic, a combination of plastics and metals and/or the like). For example, the housing 608 may be constructed from thermally conductive plastic and include a metal heat-sink. Likewise, the power converter cartridge 611 may be constructed from similar thermally conductive materials and in similar manner.

As shown in FIG. 6A, the housing 608 is a generally rigid member defining a generally horizontal, flat base and a central recessed area 614 configured for receiving the removable power converter cartridge 611. Opposing ends of the housing 608 are attached to the trunk cable 502. For example, in the illustrated embodiment, the trunk cable 502 is secured to the housing 608 in a weather-proof manner (e.g., via weather-proof rubber grommets 613a, 613b, or by over molding the housing onto the trunk cable).

In the illustrated embodiment, the power converter cartridge 611 defines a generally rigid exterior shell configured for insertion into the recessed area 614 of the housing 608. As explained in greater detail below, the power converter's electronic components are sealed within the cartridge 611 and thereby shielded from outside weather. As shown in FIG. 6A, the power converter cartridge 611 includes positive and negative terminals 602, 604 configured for connection to the photovoltaic modules (11-18). In particular, the terminals 602, 604 enable the power converter 606 to receive DC power from the photovoltaic modules (11-18), which the power converter 606 then converts into a shaped DC wave form with dead band, as described below.

The power converter cartridge 611 also includes connection terminals 610b on its opposing ends for providing an electrical connection between the power converter cartridge 611 and its housing 608. As shown in FIG. 6A, the housing 608 includes corresponding connection terminals 610a, which protrude inwardly into the housing's recessed area 614. As such, the power converter cartridge's connector terminals 610b are conductive cavities configured for reviving the housing's connector terminals 610a. In the illustrated embodiment, the connecters 610a and 610b help secure the power converter cartridge 611 in housing 608. Moreover, in the illustrated embodiment, the power converter cartridge 611 and housing 608 each include two connecters. However, in various other embodiments, the power converter cartridge 611 and housing 608 include a single connector or multiple connecters (e.g., three connecters, four connecters, five connecters and/or the like). In further embodiments, the connecters may comprise flat electrical contacts that are merely in contact with one another.

According to certain embodiments, the electrical connectors are configured to provide dedicated electrical connections between the power converter 606, adjacent power converters 606, and the above-described electric network interface 206. For example, in one embodiment, the electrical connectors include a power connection line, a fault detection line, and a synchronization line between the power converters 606 and electric network interface 206.

Figure 6B:
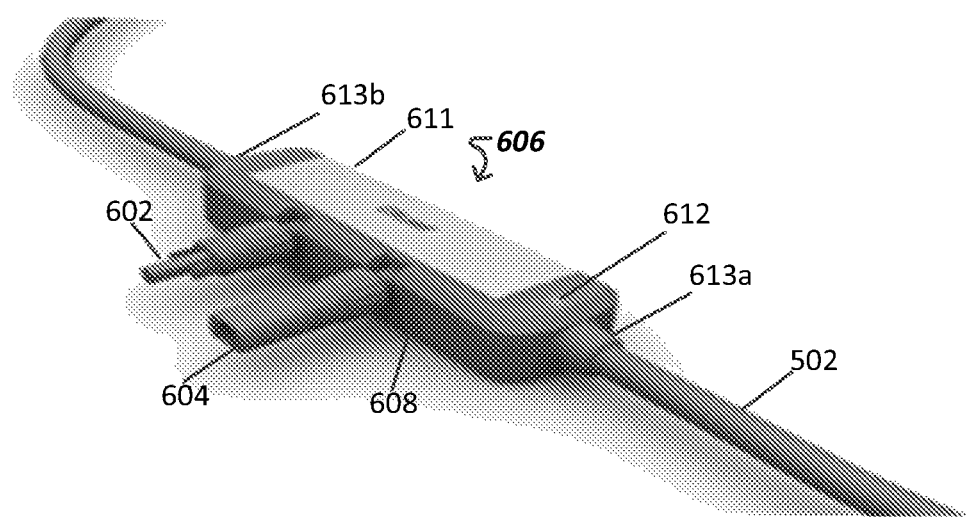
FIG. 6B shows an isometric view of the power converter cartridge and housing of FIG. 2A in which the power converter cartridge is secured to the housing.

As noted above, the power converter cartridge is configured to be removably secured within the housing 608. FIG. 6B shows the power converter cartridge 611 secured within housing 608. According to various embodiments, the housing 608 may include a latch or other fastening device (not shown) for securing and/or releasing the power converter cartridge. In other embodiments, the shape of the housing 608 facilitates the power converter cartridge 611 snapping in place when inserted into the housing.

In certain embodiments, power converters 606 may include a light emitting diode (LED) to indicate that status of the power converter. For example, the LED may display a green light if the power converter is properly secured in place. Alternatively, the LED may display a red light if the power converter is loose and/or not properly secured within housing 608.

As explained below, the power converter 606 electronics are contained within the power converter cartridge 611. In certain embodiments, when the power converter cartridge 611 is removed from the housing 608, a jumper cartridge may be inserted to bridge the gap left by the power converter cartridge. In other embodiments, a set of connectors may be provided to connect the power converter to the cable. The connectors left on the cable after removal of the power converter can then be directly connected together, thereby connecting the gap left from removal of the converter. Moreover, when a power converter 606 is determined to be faulty, it may be easily replaced by inserting a new power converter cartridge 611 into a respective housing 608.

As will be appreciated from the description herein, in one embodiment, each of the power converters 606 shown in FIG. 5B may take the configuration shown and described with respect to FIGS. 6A and 6B. In particular, the system may comprise numerous power converters 606 (e.g., 10 power converters) spread evenly along a length of the trunk cable 502 in order to facilitate ease of connection to photovoltaic modules.

Figure 7:
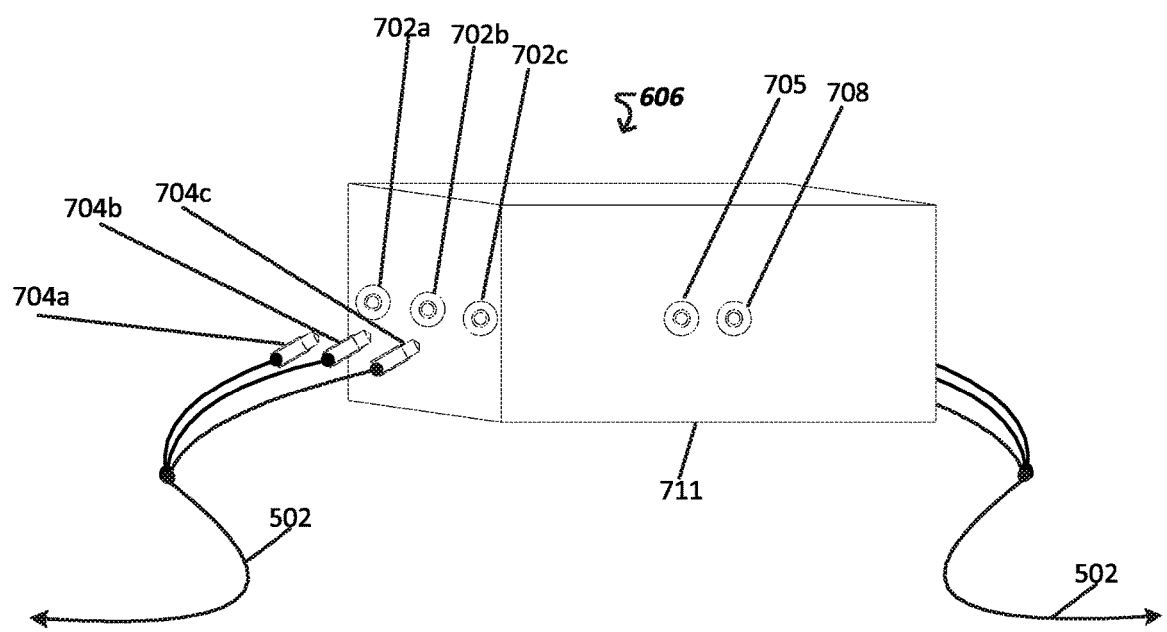
FIG. 7 shows isometric view of a cable-integrated dead band DC-DC converter according to another embodiment.

As another example, FIG. 7 shows an isometric view of a cable-integrated dead band DC power converter 606 according to another embodiment. In the illustrated embodiment of FIG. 7, the power converter's electronics are contained within a housing 711, which may be sealed for weather proofing. The power converter's housing includes positive and negative terminals 705, 708, which are configured to enable the power converter to be connected to a photovoltaic module. The housing 711 also includes terminals 702a, 702b, and 702c disposed on its opposing ends. The terminals 702a, 702b, and 702c configured to provide a detachable electrical connection with the trunk cable 502 at both ends of the housing 711. For example, as shown in FIG. 7, the trunk cable 502 includes corresponding connection terminals 704a, 704b, and 704c. The opposite end of the power converter 606 (obstructed from view in FIG. 7) is connected to a second section of the trunk cable 502 in the same fashion.

In one embodiment, the corresponding pairs of power converter and trunk cable connection terminals 702a/704a; 702b/704b; and 702c/704c are configured to provide dedication electrical connections between the power converter 606, adjacent power converters 606, and the above-described electric network interface 206. For example, in one embodiment, the terminals 702a/704a connect a power connection line, the terminals 702b/704b connect a fault detection line, and the terminals 702c/704c connect a synchronization line, each of which is established between the power converters 606 and electric network interface 206. As will be appreciated from the description herein, the terminals 702a/704a, 702b/704b, and 702c/704c may be integrated into a single multi-pin interface.

With respect to the illustrated embodiment of FIG. 7, a faulty power converter 606 may be replaced by disconnecting the trunk cable 502 from the power converter 606 and connecting the trunk cable 502 to a new power converter 606 of the same type. As a result, the practical operation of the cabling system of FIG. 7 is similar to the operation described above with reference to FIG. 6A and FIG. 6B.

Figure 8A:
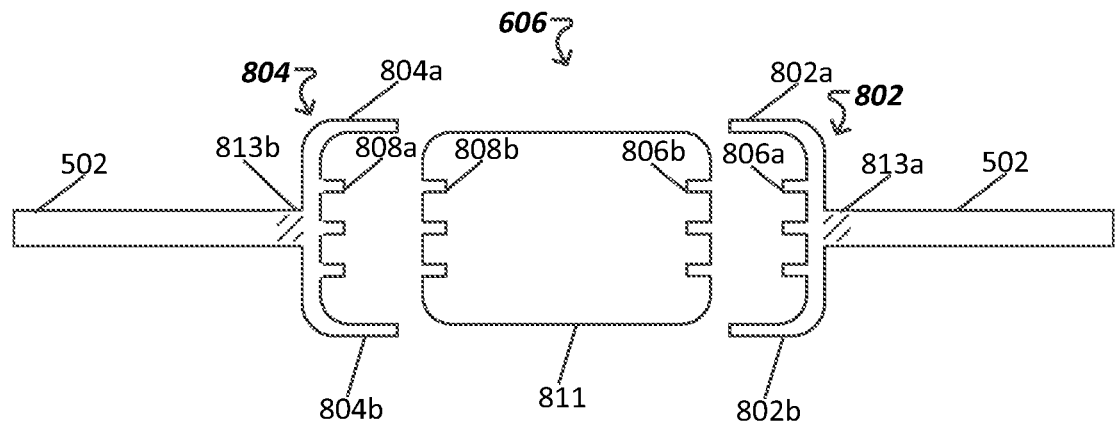
FIG. 8A shows a plan view of cable-integrated dead band DC-DC converter according to yet another embodiment.
Figure 8B:
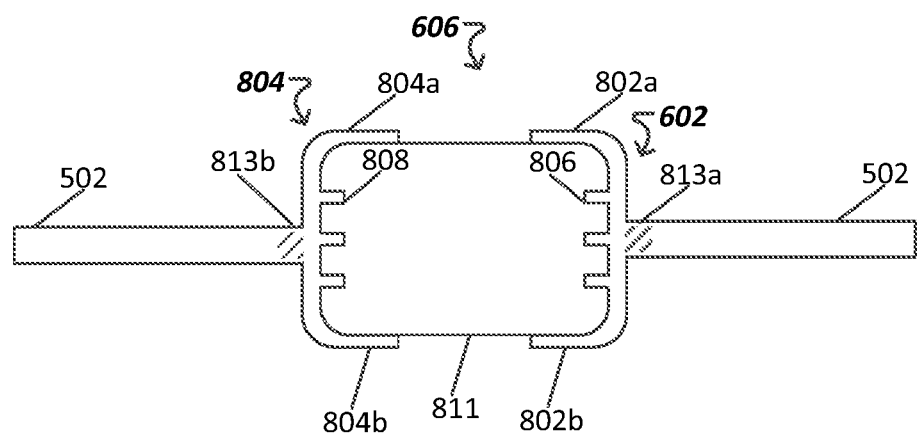
FIG. 8B shows a plan view of the cable-integrated dead band DC-DC converter of FIG. 4A.

As yet another example, FIGS. 8A and 8B show an overhead view of a cable-integrated dead band DC power converter 606 according to another embodiment. In the illustrated embodiment of FIG. 8A, the power converter's electronics are contained within a power converter cartridge 811 configured for being removably secured between brackets 804 and 802 disposed at ends of sections of the trunk cable 502. According to various embodiments, the power converter cartridge 811 is configured for being connected via positive and negative terminals (not shown) to a photovoltaic module (11-18) as described above.

Each of brackets 804 and 802 is configured for removable attachment to opposite ends of the power converter cartridge 811. For example, bracket 804 includes protruding elements 804a and 804b for removably attaching trunk cable 502 to the power converter cartridge 811. Similarly, bracket 802 includes protruding elements 802a and 802b for removably attaching trunk cable 502 to the power converter cartridge 811. As shown in FIGS. 8A and 8B, the shape of the edges of brackets 804 and 802 correspond to the shape of the edges of the power converter cartridge 811. Inserting the power converter cartridge 811 into bracket 802 secures the power converter cartridge 811 between elements 802a and 802b. Similarly, inserting power converter cartridge 811 into bracket 802 secures the power converter cartridge 811 between elements 804a and 804b. The protruding elements 804a,b; 802a,b may be configured to partially surround and engage the power converter cartridge 811 using a press-fit configuration, snap-fit configuration, a latch, a magnetic attachment, or by other suitable means.

FIG. 8A shows the power converter cartridge 811 disconnected from trunk cable 502, while FIG. 8B shows the power converter cartridge 811 connected and secured to the trunk cable 502. As illustrated in the figures, the trunk cable 502 is electrically connected to the brackets 804 and 802 (e.g., with weather-proof rubber grommets 813a, 813b to secure the connection). The brackets 804, 802 are configured for electrically connecting the power converter cartridge 811 to the trunk cable 502 via projecting terminals 806a and 808a. In particular, the projecting terminals 806a and 808a are configured for insertion into corresponding terminals 806b and 808b of the power converter cartridge 811. As can be appreciated form FIGS. 8A and 8B, inserting the terminals 806a into the terminals 806b establishes an electrical connection between a first section of the trunk cable 502 and the power converter cartridge 811, while inserting the terminals 808a into the terminals 808b establishes an electrical connection between a second section of the trunk cable 502 and the power converter cartridge 811. In addition, the connected terminals 808 and 806 help secure the power converter cartridge 811 to the brackets 802, 804 and trunk cable 502.

In one embodiment, the corresponding pairs of power converter cartridge 811 and trunk cable 502 connection terminals 808a/808b, and 806a/406b are configured to provide dedicated electrical connections between the power converter 606, adjacent power converters 606, and the above-described electric network interface 206. For example, in one embodiment, the three prongs of the electrical connections 808a,b and 806a,b shown in FIGS. 8A and 8B represent a power connection line, a fault detection line, and a synchronization line, respectively. However, as will appreciated from the description herein, the connection terminals may be integrated into a single multi-pin interface or any other suitable electrical connection interface. Indeed, in various other embodiments, the power converter cartridge 811 and housing 608 may include a single connector or multiple connecters (e.g., four connecters, five connecters and/or the like). Additionally, in further embodiments, the connecters may comprise flat electrical contacts that are merely in contact with one another.

Figure 9:
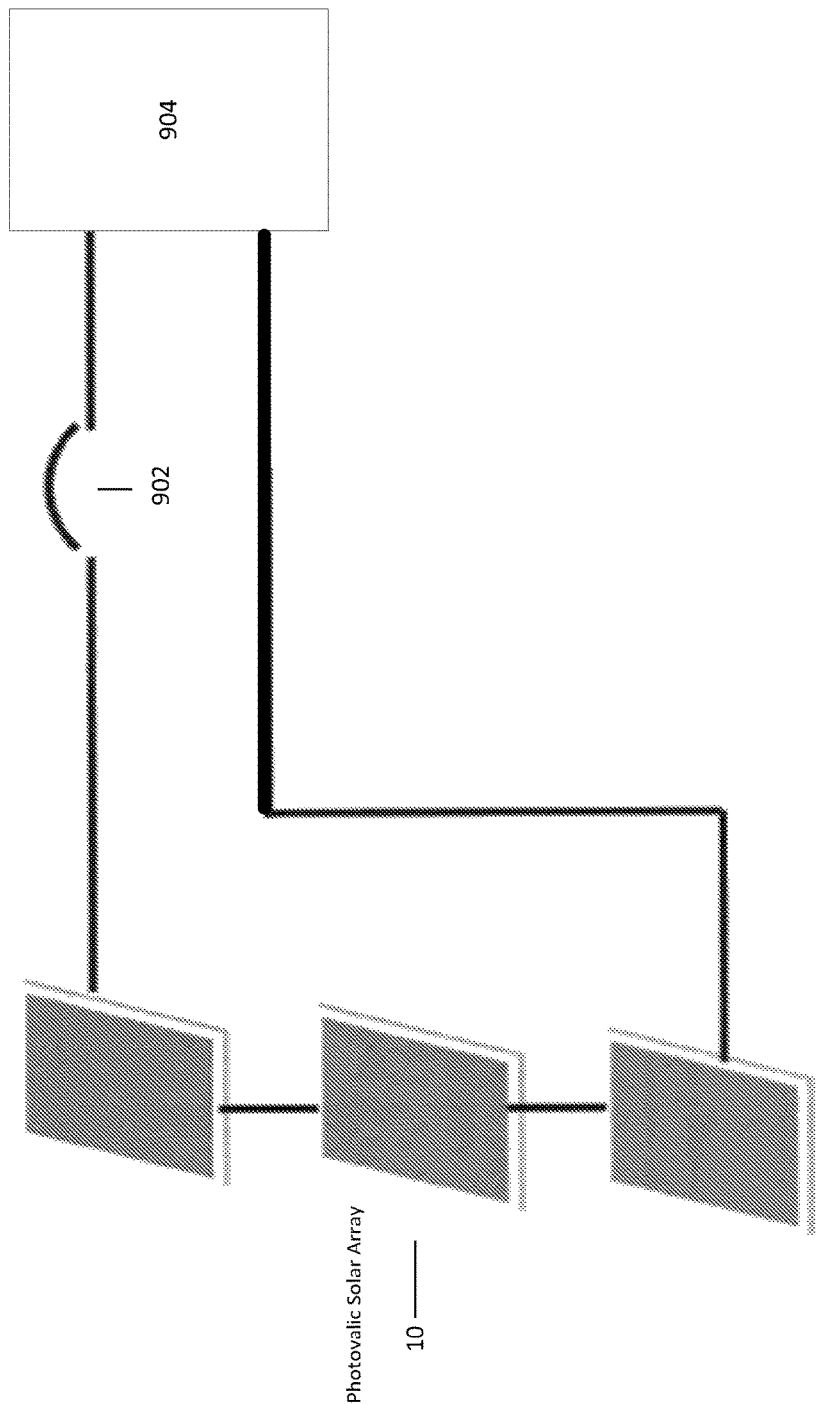
FIG. 9 shows a schematic diagram of a conventional DC transmission and distribution system.

FIG. 9 shows a schematic diagram of an alternate DC transmission and distribution system 900, without dead band DC converters, which may be improved by various embodiments describe herein. In DC transmission and distribution 900, photovoltaic solar array 10 produces power directly, as a standard DC waveform, such as waveform 103, into a DC transmission and distribution system 904. In order for DC transmission and distribution system 904 to be safe for distribution through an industrial, commercial, residential, and/or other power generation transmission and distribution environments such as a home or business, expensive DC safety precautions must be put into place. For example, DC circuit breaker 902, must be installed to prevent continuous arc faults from developing in system 904.

Figure 10:
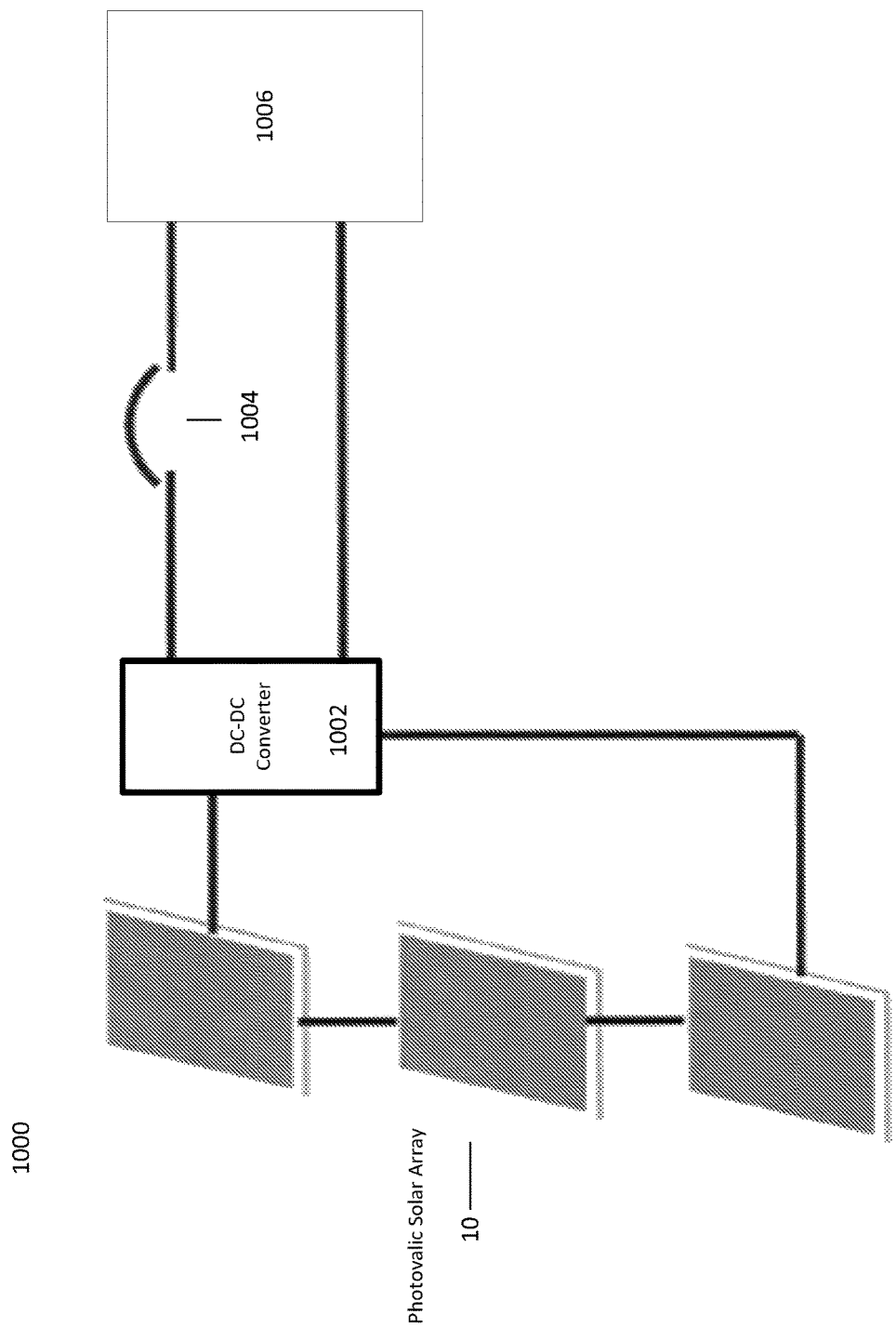
FIG. 10 shows a schematic diagram of a dead band DC transmission and distribution system according to another embodiment.

FIG. 10 shows a schematic diagram of a dead band DC transmission and distribution system 1000. The system 1000 includes a single dead band DC-DC converter 1002. DC-DC converter 1002 may be configured for converting DC power produced by photovoltaic solar array 10 to a dead band DC signal or waveform for distribution. In some embodiments, DC-DC converter 1002 may comprise both a dead band DC converter 204 and an electric network interface 206 to output a dead band DC power signal to a DC distribution network 1006. For example, a DC distribution network 1006 may provide power to an LED lighting network in a home or business. In another example, DC-DC converter 1002 may output a dead band DC power signal directly to the LED lighting network. Due to the advantages of the dead band DC signal produced by DC-DC converter 1002, dead band DC transmission and distribution system 1000 does not require more expensive DC rated equipment such as DC circuit breaker 902, but can instead utilize more common and less expensive AC circuit breaker 1004 to extinguish faults in the DC transmission and distribution system 1000.

While this specification contains many specific embodiment details, these should not be construed as limitations on the scope of any inventions described herein, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, one or more features from a combination can in some cases be excised from the combination, and the combination may be directed to a sub-combination or variation of a sub-combination.

Moreover, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the application.

That which is claimed:

1. A photovoltaic power system for supplying power to an electric grid, the system comprising:
   a solar array comprising a plurality of photovoltaic panels, wherein each photovoltaic panel is configured for generating a DC power signal;
   a plurality of DC-DC power converters each connected to at least one of the photovoltaic panels and configured for converting the DC power signal generated by its respective photovoltaic panel into a deadband DC signal, wherein the deadband DC signal comprises a rectified sine waveform having reoccurring deadband periods of zero-voltage; and
   an electric network interface connected to the plurality of DC-DC power converters and configured for converting a deadband DC signal received from the plurality of DC-DC power converters into an AC power signal, wherein the electric network interface is further connected to an electric grid and configured for supplying the AC power signal to the electric grid.

2. The photovoltaic power system of claim 1, wherein the plurality of DC-DC power converters each include a pair of switching transistors configured for converting the DC power signal into the deadband DC signal.

3. The photovoltaic power system of claim 1, wherein the DC-DC power converters are connected in series.

4. The photovoltaic power system of claim 3, wherein the DC-DC power converters are integrated as part of a continuous trunk cable.

5. The photovoltaic power system of claim 4, wherein the trunk cable includes a plurality of housings integrated into the trunk cable, and
   wherein each DC-DC power converter comprises a removable cartridge configured for being selectively engaged within one of the housings and thereby electrically integrated into the trunk cable.

6. The photovoltaic power system of claim 4, wherein the trunk cable comprises a 20-ampere rated cable.

7. The photovoltaic power system of claim 4, wherein the trunk cable is secured to the electric network interface in order to transmit the deadband DC signal generated by the DC-DC power converters to the electric network interface.

8. The photovoltaic power system of claim 1, wherein the electric network interface comprises an inverter.

9. The photovoltaic power system of claim 1, wherein the duration of each deadband period of zero voltage is approximately 100 microseconds.

10. The photovoltaic power system of claim 1, wherein the deadband DC signal's rectified sine waveform has a frequency of approximately 60 Hz.

11. The photovoltaic power system of claim 1, wherein the DC-DC power converters are configured to vary the duration of each the deadband periods.

12. The photovoltaic power system of claim 1, wherein the electric network interface is configured to communicate with and synchronize each of the DC-DC power converters.

13. A power distribution system for supplying AC power to an electric network, the system comprising:
   one or more DC-power sources each configured for generating a DC power signal;
   one or more DC-DC power converters each connected to at least one of the DC-power sources and configured for converting a DC power signal received from one of the DC-power sources into a deadband DC signal, wherein the deadband DC signal comprises a rectified waveform having reoccurring deadband periods; and
   an electric network interface connected to the plurality of DC-DC power converters and configured for converting a deadband DC signal received from the plurality of DC-DC power converters into an AC power signal.

14. The power distribution system of claim 13, wherein the deadband periods comprise periods of zero-voltage.

15. The power distribution system of claim 13, where the deadband DC signal comprises a rectified sine wave.

16. The power distribution system of claim 13, wherein the deadband periods in the deadband DC signal comprise periods of zero-voltage.

* * * * *